(12) United States Patent
Dunn et al.

(10) Patent No.: US 7,186,035 B2
(45) Date of Patent: Mar. 6, 2007

(54) OPTICAL FIBRE CONNECTOR

(75) Inventors: Mark Jeffrey Dunn, Ipswich (GB); Nicholas Turner, Ipswich (GB)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 66 days.

(21) Appl. No.: 10/844,009

(22) Filed: May 12, 2004

(65) Prior Publication Data

US 2005/0254756 A1 Nov. 17, 2005

(51) Int. Cl.
G02B 6/38 (2006.01)
G02B 6/36 (2006.01)

(52) U.S. Cl. .......................... 385/72; 385/55; 385/56; 385/58; 385/59; 385/60; 385/70; 385/73; 385/76; 385/77; 385/78; 385/86

(58) Field of Classification Search .................... 385/72
See application file for complete search history.

(56) References Cited

U.S. PATENT DOCUMENTS

| | | | | |
|---|---|---|---|---|
| 4,118,105 A * | 10/1978 | Voigt | | 385/88 |
| 4,166,668 A * | 9/1979 | MacLeod | | 385/94 |
| 4,168,883 A * | 9/1979 | MacLeod | | 385/92 |
| 4,406,514 A * | 9/1983 | Hillegonds et al. | | 385/88 |
| 4,461,538 A * | 7/1984 | Breed et al. | | 385/88 |
| 4,607,911 A * | 8/1986 | Rhodes | | 385/86 |
| 5,274,723 A * | 12/1993 | Komatsu | | 385/92 |
| 5,315,680 A | 5/1994 | Musk et al. | | 385/88 |
| 5,434,941 A * | 7/1995 | Bechtel et al. | | 385/94 |
| 5,452,391 A * | 9/1995 | Chou et al. | | 385/92 |
| 5,570,445 A * | 10/1996 | Chou et al. | | 385/92 |
| 5,724,466 A * | 3/1998 | Rickenbach et al. | | 385/60 |
| 6,072,814 A * | 6/2000 | Ryan et al. | | 372/35 |
| 6,164,834 A * | 12/2000 | Lee | | 385/56 |
| 6,530,801 B2 * | 3/2003 | Bates et al. | | 439/364 |
| 6,612,750 B1 * | 9/2003 | Bull et al. | | 385/65 |
| 6,634,799 B2 * | 10/2003 | Auld | | 385/76 |
| 6,899,467 B2 * | 5/2005 | McDonald et al. | | 385/78 |
| 6,913,402 B2 * | 7/2005 | Bohlin et al. | | 385/93 |
| 2003/0063866 A1 * | 4/2003 | Melton et al. | | 385/76 |
| 2005/0157985 A1 * | 7/2005 | McGowan et al. | | 385/88 |

\* cited by examiner

*Primary Examiner*—Frank G. Font
*Assistant Examiner*—Ryan Lepisto

(57) ABSTRACT

An optical fibre connector includes a connector having a receptacle or socket with a recessed optical fibre ferrule assembly for aligning an optical fibre within the connector. An optical socket has recessed therein a sleeve for receiving and bringing into optical alignment an optical fibre ferrule assembly at an internal end of the socket with a similar optical fibre ferrule assembly of an optical plug connected to the optical socket. The optical connector has a housing with at least two portions that are removably secured to one another. A method of cleaning such a recessed assembly includes removing at least one of said portions from the remainder of the housing. Contamination is then cleaned from the optical fibre ferrule assembly. Then, the the removed portion(s) are reassembled with the remainder of the housing.

11 Claims, 1 Drawing Sheet

OPTICAL FIBRE CONNECTOR

BACKGROUND OF THE INVENTION

1. Field of the Invention

The present invention relates to an optical fibre connector, and particularly a connector having a receptacle or socket with a recessed optical fibre/ferrule assembly for aligning an optical fibre within the connector, and to a method of cleaning such a recessed assembly.

2. Brief Description of Related Developments

Optical devices such as optical transceiver units often have an optical port for receiving and/or transmitting laser light from/into optical fibre cables, for example as part of an optical communications system. The optical fibre cable has at its end a connector by which one or more optical fibres within the cable may be connected and disconnected to a mating connector at the port. Usually, the fibre cable connector is a male type connector feature (hereinafter referred to as an "optical plug"), which locates within a female type connector feature (hereinafter referred to as an "optical socket"), on the laser transceiver unit.

The optical transceiver unit will normally be fixed in place, for example as part of a rack of similar such transceiver units. One reason for this arrangement is to protect the exposed end of one or more optical fibres within the optical socket, either from physical damage or from dirt or dust. It is easier to repair the termination of an optical fibre cable having an optical plug than it is a transceiver unit. A damaged optical fibre cable may be recut, reassembled and polished or may have its exposed end cleaned. In contrast, an optical port may have a relatively short fibre stub which needs to be maintained in a preset alignment with other optical components, such as a photodiode detector or a laser diode source.

Another reason why it may be desirable to provide the optical socket at the transceiver unit is that an optical fibre end, which is recessed in the socket, can be made eye-safe when the cable connector is not connected to a laser transmitter port. In many cases, optical communications links operate at near-infrared wavelengths of 1.3 µm and 1.5 µm, which presents added risk because such wavelengths are invisible. Applicable eye-safety standards for infra-red laser diode transmitter units are the US Standard CDRH Class 1 and the European Standard IEC 825.

Current laser safety guidelines require that the output power density from an optical port of an optical transmitter unit be limited to a level, which is eye-safe when no fibre optic connector is connected to the port. Optical coupling efficiencies from a laser diode into an optical fibre are typically quite low, for example of the order of about 1% to 25%. Even if the amount of laser radiation transmitted by the fibre is eye-safe, the total amount of optical radiation emitted by the laser diode may far exceed the limit of eye-safety. It may therefore be necessary either to block unwanted light within the port, or to defocus stray light emitted by the port when no optical connector is connected to the port.

One type of optical socket which addresses this problem is disclosed in patent document U.S. Pat. No. 5,315,680, the contents of which are incorporated herein by reference, which describes an optical port having a short optical fibre stub held securely in alignment with a laser diode concealed within an optical transmitter unit. Collimating optics are used to focus the laser light into a single-mode core of the fibre. The fibre stub is typically 5 mm to 6 mm long. Light which is not coupled into the core enters the fibre optic cladding, and is dissipated by multiple reflections and scattering within the core and by the exterior surface of the cladding. Any laser radiation that exits from the cladding is not collimated, and is essentially "defocussed" so that the inherent brightness of such stray radiation is greatly reduced. Eye-safety is further enhanced by recessing the end of the optical fibre within a cylindrical housing that extends forwards of the optical fibre end and which forms an optical socket into which an optical fibre cable plug is plugged.

The optical fibres of the optical socket and optical plug are centered axially in corresponding ceramic ferrules. Alignment between the optical fibres of the optical socket and optical plug is provided by a cylindrical split sleeve in the socket which extends around and forwards of the optical socket ferrule and which grips and locates the cylindrical ferrule of the optical plug when this is inserted into the socket.

This arrangement has been known for many years, and while this does in general provide good protection to the end of the fibre stub in the optical socket, the exposed fibre end may still become contaminated with dust or dirt. Because of the recessed position of the exposed fibre end, it can be difficult to clean away such contamination in order to improve optical coupling between the optical socket and an optical plug. The conventional method for cleaning such a component is to push a cleaning swab, to which has been applied a cleaning solution, into the receptacle in order to wipe the exposed fibre end. Although this can be done satisfactorily, it is likely that the receptacle will require many attempts at cleaning, interposed with tests to see if good optical coupling has been achieved between the optical socket and the optical plug. Furthermore, it is likely that contamination will remain somewhere within the optical socket assembly.

SUMMARY OF THE INVENTION

It is an object of the present invention to provide an optical fibre connector that has a recessed optical fibre within an optical socket and from which it is easier to clean away contamination when such contamination adversely affects coupling of light between the optical socket and a matching optical plug.

According to the invention, there is provided an optical fibre connector, comprising:

- a housing;
- an optical socket within the housing;
- a cylindrical ferrule at an internal end of the socket, a cylindrical axis of the ferrule defining a connection direction;
- an annular sleeve inside the socket and which extends around the ferrule to locate the ferrule with respect to the socket; and
- an optical fibre held within the ferrule and secured thereby with respect to the socket; wherein
- the optical socket has an opening for receiving a matching optical plug along the connection direction to make an optical connection with said optical fibre;
- the optical fibre has a fibre end for receiving and/or transmitting optical radiation when said optical connection is made and said fibre end being at a recessed location within the socket;
- the annular sleeve extends in the connection direction from the ferrule towards the socket opening for receiving a similar ferrule of said matching optical plug to align said received ferrule with respect to said optical fibre to make said optical connection; characterised in that the housing has at least two portions that are removably secured to one another, the arrangement being such that at least one of said portions may be temporarily removed from the remainder of the housing to facilitate access to the ferrule and/or the fibre end for cleaning of the ferrule and/or fibre end.

The optical fibre/ferrule assembly may therefore be cleaned more quickly and more thoroughly in order to remove contamination that may be affecting the efficiency of optical coupling between aligned optical fibres held within the optical socket ferrule and an optical plug ferule.

In a preferred embodiment of the invention, the sleeve also may be temporarily removed from around the ferrule when the housing portion(s) is/are temporarily removed from the remainder of the housing. This may completely expose the optical fibre/ferrule assembly and so further facilitate access to the ferrule and/or the fibre end for cleaning of the ferrule and/or fibre end.

Also in a preferred embodiment of the invention, the housing comprises a first portion and a second portion. The first portion is permanently secured to the ferrule and the second portion is removably secured to the first portion.

The housing portions may be secured to each other by means of a threaded coupling, by means of a bayonet coupling, or by any other conveniently releasable coupling.

The removable portion of the housing may have on an outer surface one or more grip features by which the removable portion may be rotated to remove or rejoin the removable portion from the remainder of the housing.

If necessary a special tool may be provided for removing the removable portion(s) from the remainder of the housing, and for reassembly of the portions after contamination has been cleaned away.

In a preferred embodiment of the invention, the outer surface of the housing is a substantially cylindrical outer surface that is coaxial with the ferrule axis. The grip feature may then be one or more flats on this outer surface.

The sleeve may make a sliding fit, and preferably a close sliding fit, with both a removable portion of the housing and a fixed portion of the housing. Preferably, the removable portion of the housing has a retaining feature, which serves in use to retain the sleeve within the housing when the housing portions are secured to one another. The sleeve is therefore removable from around the ferrule when the housing removable portion is removed from the remainder of the housing.

Also according to the invention, there is provided a method of cleaning contamination from an optical socket of an optical fibre connector, the socket having recessed therein a sleeve for receiving and bringing into optical alignment an optical fibre/ferrule assembly at an internal end of the socket with a similar optical fibre/ferrule assembly of an optical plug connected to the optical socket, said optical connector having a housing with at least two portions that are removably secured to one another, characterised in that the method comprises the steps of:

i) removing at least one of said portions from the remainder of the housing;
ii) cleaning contamination from the optical fibre/ferrule assembly; and
iii) reassembling said removed portion(s) with the remainder of the housing.

Optionally, the method further comprises the steps of removing the sleeve from the ferrule prior to cleaning the contamination, and then replacing the sleeve prior to reassembling the removed portion(s) with the remainder of the housing.

BRIEF DESCRIPTION OF THE DRAWINGS

The invention will now be further described, by way of example only, and with reference to the accompanying drawings in which.

DETAILED DESCRIPTION OF THE PREFERRED EMBODIMENTS

Figure 1:
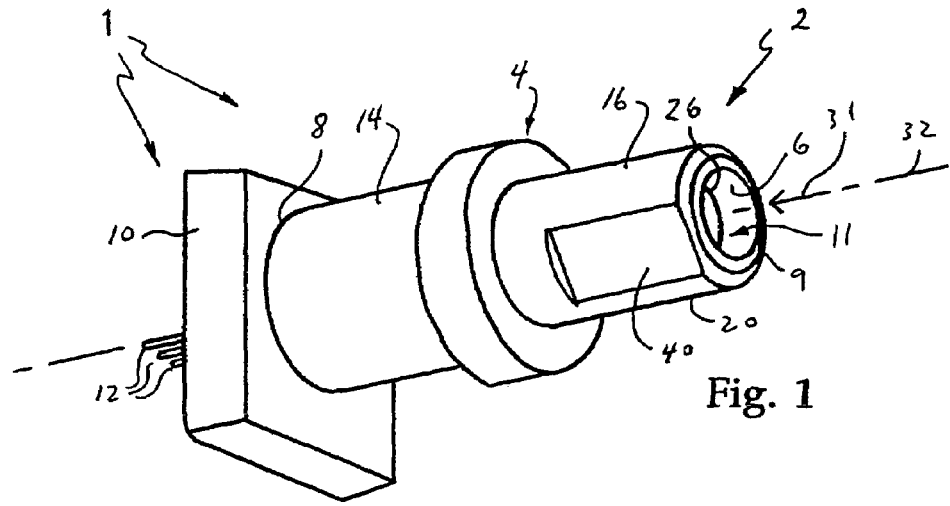
FIG. 1 shows a perspective view of an optical connector according to the invention, having a housing with an optical socket.

FIG. 1 shows a perspective view of an optical connector 2 according to the invention, which in this example is part of an optical transmitter unit 1. The connector has a housing 4 with an axial bore 6 that is substantially cylindrical. At one end 8 of the housing 4 is mounted a laser transmitter module 10 secured permanently to the housing 4, for example by an organic adhesive or by welding (not shown). At an opposite end 9 of the housing 4, is an optical socket 11 for receiving a matching optical plug when the optical connector 2 is used to make an optical connection, for example with a fibre optic cable (not shown). The optical plug may be a termination to an optical fibre cable, and similarly, the optical transmitter unit 1 may be installed in a rack of other optical transceiver units (not shown).

Electrical connections to the transmitter module 10 are via contact pins 12, which project from module 10. The contact pins are electrically connected to electronic or opto-electronic components within the module 10, for example a laser diode, photodiode, and associated control circuitry (not shown). The operation of the transmitter module 10 and internal electrical and opto-electronic components is conventional and well-known to those skilled in the art, and so will not be further described.

Figure 2:
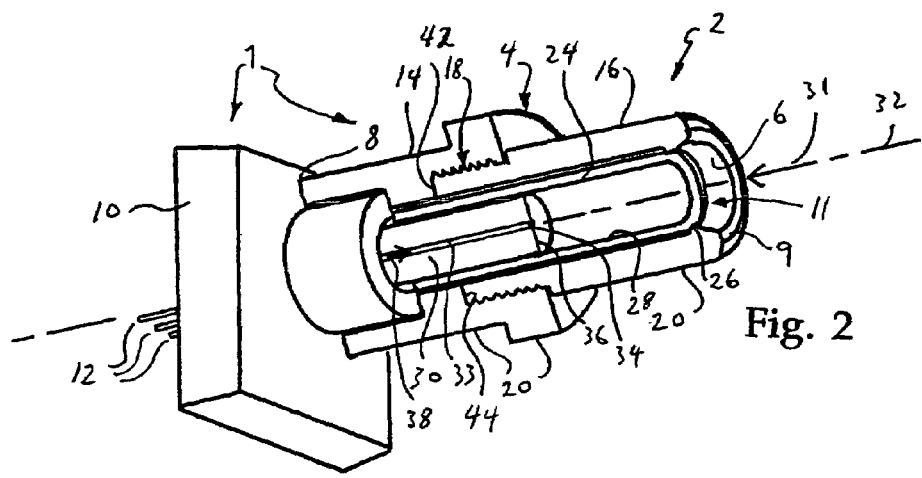
FIG. 2 shows a partially cut-away perspective view of the optical connector of FIG. 1, showing that the housing is formed from two portions joined by means of a threaded coupling and showing in the interior of the socket an optical fibre/ferrule assembly and an annular sleeve that extends forwards of the assembly towards an opening to the socket.

With reference now also to FIG. 2, the housing 4 is formed from two portions, namely a first portion 14 that is permanently affixed to the transmitter module 10, and a second portion 16 which is removably secured to the first portion 14, for example by a threaded coupling 18.

Both the first portion 14 and the second portion 16 are substantially annular, having a stepped cylindrical outer surface 20 that is concentric with the substantially cylindrical bore 6. A ceramic split sleeve 24 makes a close sliding fit within the bore 6 of both housing portions 14, 16. The end 9 of the housing has an inwardly directed annular lip 26 that defines an opening to the socket 11. The lip 26 is sized to retain the split sleeve 24 within the housing. The inner portions of the socket 11 are defined by a cylindrical inner surface 28 of the sleeve 24. An inner end of the socket 11 is closed by a ceramic ferrule 30 that fills an inner half of the sleeve 24.

Prior to assembly of the connector 2, the inner diameter of the cylindrical surface 28 of the split sleeve 24 is slightly less that the outer diameter of the ferrule 30 so that when the ferrule 30 is seated inside the sleeve 24. The sleeve grips the ferrule so that both the ferrule 30 and sleeve 24 share a common axis 32, which is also the axis of the socket 11 and which defines a connection direction 31.

In the illustrated embodiment, one single mode optical fibre stub 33 is held within the sleeve 11. The optical fibre stub 33 extends along the axis 32 from a fibre end 34 at a polished disc-shaped end face 36 of the ferrule 30 towards the laser transmitter module 10 at which optical radiation 38 is coupled into the fibre 33.

When an optical plug (not shown) with a projecting optical fibre/ferrule assembly similar to that 30, 33 of the connector 2 is inserted along the connection direction 31 into the socket 11, the split sleeve 24 grips the ferrule of the optical plug until the ferrules abut each other, at which point the optical fibres of the optical socket and plug will be in alignment, thereby making an optical connection between the optical socket of the optical connector 2 and a matching optical plug.

Figure 3:
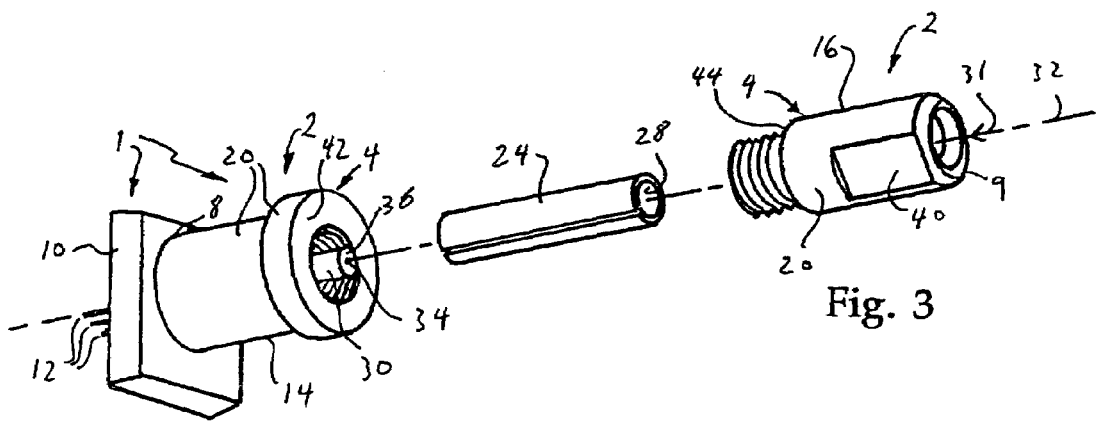
FIG. 3 is an exploded perspective view of the optical connector of FIG. 1 showing how the housing comes apart and how the sleeve may be separated from the ferrule to give access to the optical fibre/ferrule assembly and thereby facilitate the cleaning of contamination from the assembly.

Over time, the disc-shaped end surface 36 of the ferrule and/or the end face 34 of the optical fibre stub 33 may become contaminated with dust or dirt, thereby adversely affecting the optical coupling described above. As shown most clearly in FIG. 3, the invention permits the first and second portions 14, 16 of the housing 4 to be readily disassembled in order to gain direct access to such contaminated surfaces.

The first step in the disassembly of the housing 4 is to unscrew the housing second portion 16 from the housing first portion 14. This is done by using a tool, such as a wrench to grip a pair of flats 40 on opposite external sides of the housing second portion 16. The flats 40 are both parallel with each other and with the axis 32.

The housing second portion 16 can then be rotated to unscrew the housing second portion from the first portion 14.

Once the housing portions 14, 16 are separated, the split sleeve 24 can be pulled off the ferrule 30, which will normally be permanently retained to the housing first portion 14, for example by an adhesive or by means of an inner sleeve (not shown), for example as described in U.S. Pat. No. 5,315,680.

The end faces of the optical fibre/ferrule assembly 30, 33 may then be cleaned. The invention also makes it easier to clean the inside cylindrical surface 28 of the sleeve, once this has been removed from the ferrule 30.

After cleaning, the sleeve 24 is replaced over the ferrule 30, and the housing second portion 16 is again secured to the housing first portion by engaging the threaded coupling 18. In doing so, an annular shoulder 42 on the on the housing first portion 16 comes into contact with an annular shoulder 44 on the housing second portion 16, thereby limiting and setting the relative orientations of the two portions 14, 16 in the axial connection direction 31.

The optical transmitter unit using an optical connector 2 described above conforms to the US Standard CDRH Class 1 or the European Standard IEC 825, as regards the emitted radiance from the unit 1 with no optical fibre cable connected to the optical socket 11. The invention requires no special modifications to the ferrule 30, the fibre stub 33 or to the split sleeve 24 in order to facilitate access for cleaning of the optical fibre/ferule assembly 30,33.

Although the invention has been described in terms of an optical fibre cable having a male type connector which locates within a female type connector on the laser transmitter unit, the invention is equally applicable to optical fibre connectors having the opposite polarity, that is, with an optical fibre cable having a female type connector which locates within a male type connector on the laser transceiver unit. In this case, the removably secured housing portions would be provided as part of the termination to the optical fibre cable.

The invention therefore provides a convenient method and apparatus for cleaning and removing contamination from within an optical fibre connector having a recessed optical fibre within an optical socket.

What is claimed is:

1. An optical fibre connector, comprising:
    a housing;
    an optical socket within the housing;
    a cylindrical ferrule at an internal end of the socket having a cylindrical axis defining a connection direction;
    an annular split sleeve inside the socket and extending around the ferrule to locate the ferrule with respect to the socket; and
    an optical fibre held within the ferrule and secured thereby with respect to the socket; wherein
        the optical socket has an opening for receiving a matching optical plug along the connection direction to make an optical connection with said optical fibre;
        the optical fibre has a fibre end for receiving and/or transmitting optical radiation when said optical connection is made and said fibre end being at a recessed location within the socket;
        the annular split sleeve extends in the connection direction from the ferrule towards the socket opening for receiving a similar ferrule of said matching optical plug to align said received ferrule with respect to said optical fibre to make said optical connection; and
        the housing has at least two portions that are removably secured to one another, wherein at least one of said at least two portions is removable from the remainder of the housing to access the ferrule and the fibre end for cleaning thereof, and wherein the annular spilt sleeve makes a sliding fit with an inside surface of a bore of both the removable portion of the housing and the remainder of the housing.

2. The optical fibre connector of claim 1, wherein the annular split sleeve is removable from around the ferrule when said at least one of said at least two housing portions is removed from the remainder of the housing to access the ferrule and the fibre end for cleaning thereof.

3. The optical fibre connector of claim 1, wherein the at least two housing portions comprise a first portion permanently secured to the ferrule and a second portion removably secured to the first portion.

4. The optical fibre connector of claim 3, wherein the first portion and the second portion are substantially annular.

5. The optical fibre connector of claim 1, wherein the at least two housing portions are removably secured to each other by means of a threaded coupling.

6. The optical fibre connector of claim 1, wherein the at least two housing portions are removably secured to each other by means of a bayonet coupling.

7. The optical fibre connector of claim 1, wherein said at least one of the at least two housing portions has an outer surface on which is provided one or more grip features for rotating to remove or rejoin said at least one housing portion from the remainder of the housing.

8. The optical fibre connector of claim 7, wherein said outer surface is substantially cylindrical and coaxial with the ferrule axis, said one or more grip features including one or more flats on said outer surface.

9. The optical fibre connector of claim 1, wherein said removable portion of the housing includes a retaining feature which serves in use the annular split sleeve within the housing when said portions are secured to one another, the split sleeve therefore being removal from around the ferrule when said removable portion is removed from the remainder of the housing.

10. A method of cleaning contamination from an optical socket of an optical fibre connector, the socket having recessed therein an annular spilt sleeve for receiving and bringing into optical alignment first optical fibre ferrule assembly at an internal end of the socket with a second optical fibre ferrule assembly of an optical plug connected to the optical socket, said optical connector having a housing with at least two portions that are removably secured to one another, the method comprising:

removing at least one of said portions from the remainder of the housing and the sleeve;

cleaning contamination from the optical fibre ferrule assembly; and reassembling said at least one of said portions with the remainder of the housing such that the annular split sleeve makes a sliding fit with an inside surface of a bore of both the at least one removable portion of the housing and the remainder of the housing.

11. The method of claim 10, further comprising:

removing the annular split sleeve from the ferrule prior to cleaning said contamination, and replacing the annular spilt sleeve prior to reassembling said at least one of said portions with the remainder of the housing.

* * * * *

UNITED STATES PATENT AND TRADEMARK OFFICE
CERTIFICATE OF CORRECTION

PATENT NO. : 7,186,035 B2  Page 1 of 1
APPLICATION NO. : 10/844009
DATED : March 6, 2007
INVENTOR(S) : Mark Dunn It is certified that error appears in the above-identified patent and that said Letters Patent is hereby corrected as shown below:

Col. 2 Line 10 Delete "assembley" and insert -- assembly --, therefor.

Col. 2 Line 13 After "Then, the" delete "the".

Col. 6 Line 39 In Claim 1, delete "spilt" and insert -- split --, therefor.

Col. 7 Line 3 In Claim 9, after "use" insert -- to retain --.

Col. 7 Line 5 In Claim 9, delete "removal" and insert -- removable --, therefor.

Col. 7 Line 10 In Claim 10, delete "spilt" and insert -- split --, therefor.

Col. 7 Line 11 In Claim 10, after "alignment" insert -- a --.

Col. 8 Line 13 In Claim 11, delete "spilt" and insert -- split --, therefor.

Signed and Sealed this

Twenty-third Day of December, 2008

JON W. DUDAS
*Director of the United States Patent and Trademark Office*